July 7, 1964 R. SCHWERTER 3,139,899

PILOT LOADED PRESSURE REGULATOR

Filed Sept. 22, 1961

INVENTOR.
BY Robert Schwerter
Ralph Hamman
Attorney

United States Patent Office 3,139,899
Patented July 7, 1964

1

3,139,899
PILOT LOADED PRESSURE REGULATOR
Robert Schwerter, Anaheim, Calif., assignor to American Meter Company, Incorporated, Philadelphia, Pa., a corporation of Delaware
Filed Sept. 22, 1961, Ser. No. 139,964
3 Claims. (Cl. 137—489.5)

This invention is a pilot loaded pressure regulator in which the pilot pressure is bled downstream through a check valve in the main diaphragm. This prevents equalization of the pilot and downstream pressures upon interruption of the flow through the regulator outlet and thereby insures positive closing of the pressure regulator valve.

Figure 2:
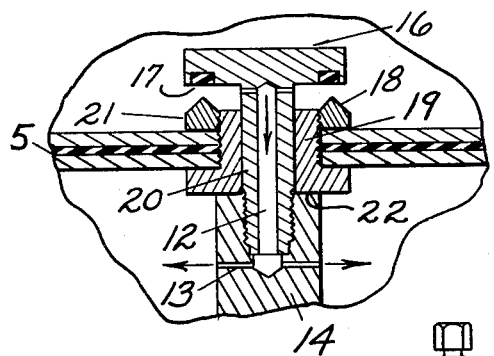
Figure 3:
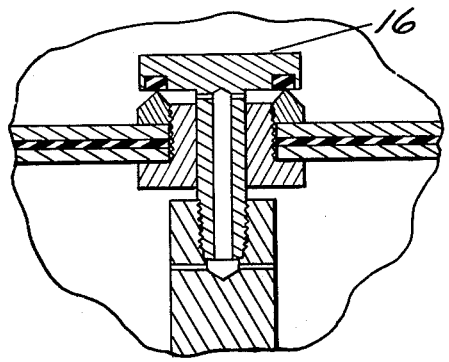
Figure 1:
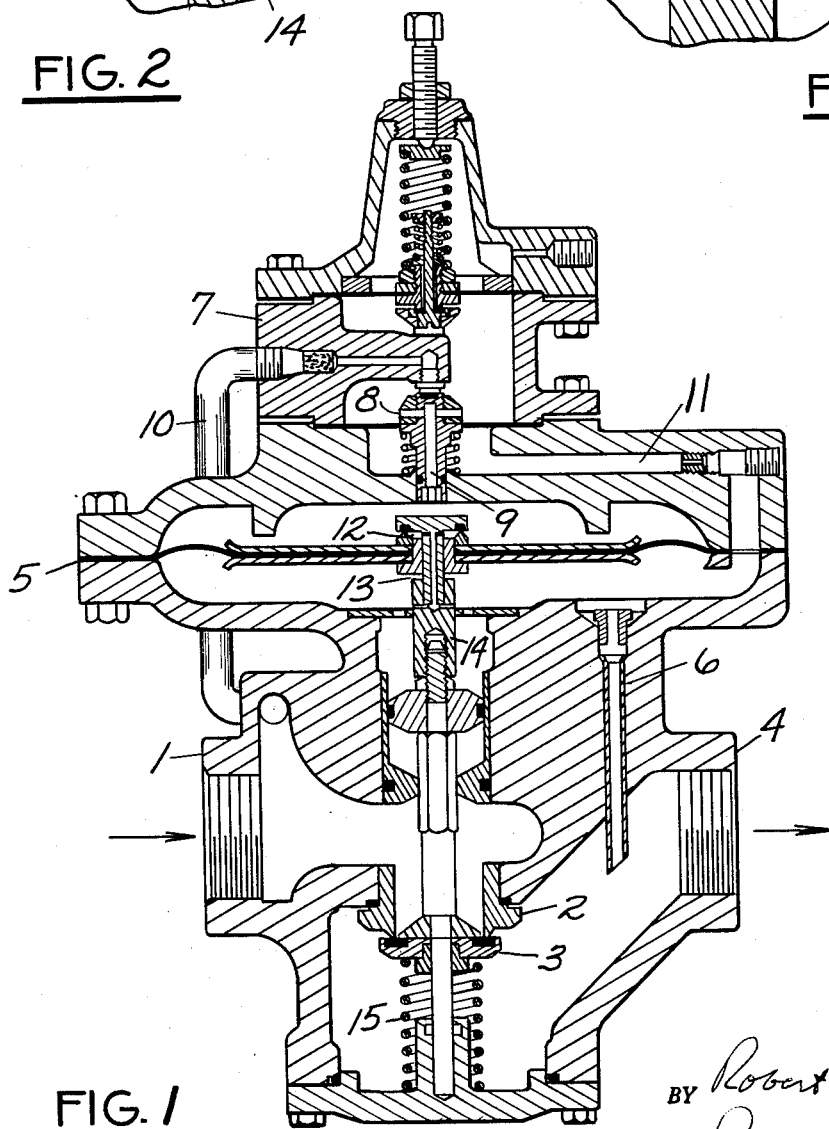

In the drawing, FIG. 1 is a section through a pilot loaded regulator, FIG. 2 is an enlarged section through the main diaphragm and check valve with the check valve in the normal position and FIG. 3 is a similar view showing the check valve closed by the rise in downstream pressure accompanying interruption of the flow through the regulator.

The common parts of the regulator are readily identified, 1 being the inlet for the high pressure gas, 2 the inlet orifice, 3 the valve member and 4 the outlet for the pressure regulated gas. The pressure of the gas at the outlet is controlled by a main diaphragm 5 having its under side connected through a tube 6 to the outlet pressure and having its upper side connected through the ways 8, 9 to the output of a pilot regulator 7. The particular pilot regulator shown has its inlet connected through line 10 to the inlet of the regulator and has a feed back line 11 from the main regulator output pressure which increases the sensitivity of the pilot regulator. The pilot regulator output pressure is larger than the output pressure of the main regulator. It is accordingly possible to bleed the pilot pressure downstream into the main regulator output. This is done through ways 12 and 13 in valve stem connector 14. Under normal operation, the differential pressure on the main diaphragm 5 in conjunction with spring 15 varies the position of the valve member 3 to maintain the desired outlet pressure.

So long as there is gas flowing through the regulator outlet 4, the regulator operates in the normal manner to maintain the outlet pressure. However, if there were a continuous downstream bleed of pilot pressure through the ways 12 and 13, the pressure across the main diaphragm 5 would eventually equalize if for any reason the flow through the regulator outlet were interrupted. Also, it is possible that deterioration of a seat of the valve member 3 or foreign matter will prevent closing of the valve under the normally available force. Under these conditions, the outlet pressure rises steadily but the tendency of the pilot pressure to equalize across the main diaphragm prevents an increase in the closing force from the main diaphragm. This problem is overcome by a check valve associated with the main diaphragm, which closes the downstream bleed passages 12, 13 and prevents equalization of the pressure across the main diaphragm 5 so that the increased outlet pressure can hold the valve 3 closed and prevent further increase in the outlet pressure. This check valve comprises a valve member 16 fixed to the upper end of the valve stem connector 14 and having a seat 17 normally spaced above a clamping nut 18 on a bushing 19

2 at the center of the main diaphragm. The bushing 19 is slidable on the stem 20 of the valve member 16. The upper side of the nut 18 has an annular projection 21 cooperating with the valve seat 17. Under normal conditions, the pilot pressure is greater than the outlet pressure and the bushing 19 is held against the upper end 22 of the valve stem connector 14. This provides a space between the valve seat 17 and the projection 21 through which the pilot pressure can bleed through the ways 12 and 13. This is the condition for normal operation. Under abnormal conditions, when the outlet pressure rises because the normal closing force is not large enough to close the valve 3, as soon as the outlet pressure exceeds the pilot pressure, the main diaphragm lifts off the end of the valve stem connector 14 and closes the annular projection 21 against the seat 17, thereby stopping the bleed of pilot pressure to the under side of the diaphragm 5. Once the downstream bleed is cut off, there can be no equalization of pressure across the main diaphragm and the main diaphragm is fully effective to close the valve 3 and prevent a further increase in outlet pressure.

What is claimed as new is:

1. In a gas pressure regulator having an inlet, an outlet, a chamber communicating with the outlet and closed by a diaphragm, flow restricting means between the inlet and outlet, operating means for the flow restricting means including a post within the chamber and slidably extending through the center of the diaphragm and having a shoulder within the chamber engaging the inner side of the diaphragm and a valve member outside the chamber and spaced from the outer side of the diaphragm, pilot regulator means supplying a loading pressure greater than the normal outlet pressure of the regulator to the outer side of the diaphragm whereby the diaphragm is normally held against the shoulder and is lifted off the shoulder when the outlet pressure rises above the loading pressure, a cooperating valve member on the diaphragm spaced from said first valve member when the diaphragm rests on the shoulder and closing against the first valve member when the diaphragm is lifted off the shoulder, and a bleed way from the outer to the inner side of the diaphragm shut off by the closing of said cooperating valve member against said first valve member.

2. In a gas pressure regulator having an inlet, an outlet, a chamber communicating with the outlet and closed by a diaphragm, flow restricting means between the inlet and outlet, operating means for the flow restricting means including a post within the chamber and slidably extending through the center of the diaphragm and having a shoulder within the chamber engaging the inner side of the diaphragm and a valve member outside the chamber and spaced from the outer side of the diaphragm, pilot regulator means supplying a loading pressure greater than the normal outlet pressure of the regulator to the outer side of the diaphragm whereby the diaphragm is normally held against the shoulder and is lifted off the shoulder when the outlet pressure rises above the loading pressure, a way through the post from the outer to the inner side of the diaphragm for bleeding the loading pressure to the inner side of the diaphragm, and a valve member on the diaphragm cooperating with the valve member on the post to close said way when the diaphragm is lifted off the shoulder.

3. In a gas pressure regulator having an inlet, an outlet, flow restricting means between the inlet and outlet, operating means for the flow restricting means including a main diaphragm loaded on one side by the outlet pressure and on the opposite side by a pilot pressure higher than the outlet pressure, a lost motion connection between the main diaphragm and the flow restricting means, a downstream bleed way from the pilot pressure to the outlet pressure, and means responsive to relative motion between the diaphragm and said flow restricting means for shutting off the downstream bleed way upon excessive outlet pressure.

References Cited in the file of this patent

UNITED STATES PATENTS

| | | |
|---|---|---|
| 2,309,848 | King | Feb. 2, 1943 |
| 2,593,557 | Hamilton | Apr. 22, 1952 |
| 2,917,268 | Soderberg et al. | Dec. 15, 1959 |
| 3,020,925 | Randall et al. | Feb. 13, 1962 |

FOREIGN PATENTS

| | | |
|---|---|---|
| 77,027 | Germany | Sept. 5, 1894 |
| 562,703 | France | Nov. 17, 1923 |